May 7, 1946.  P. EDBERG  2,399,916
REFRIGERATION
Filed Sept. 16, 1941   2 Sheets-Sheet 2
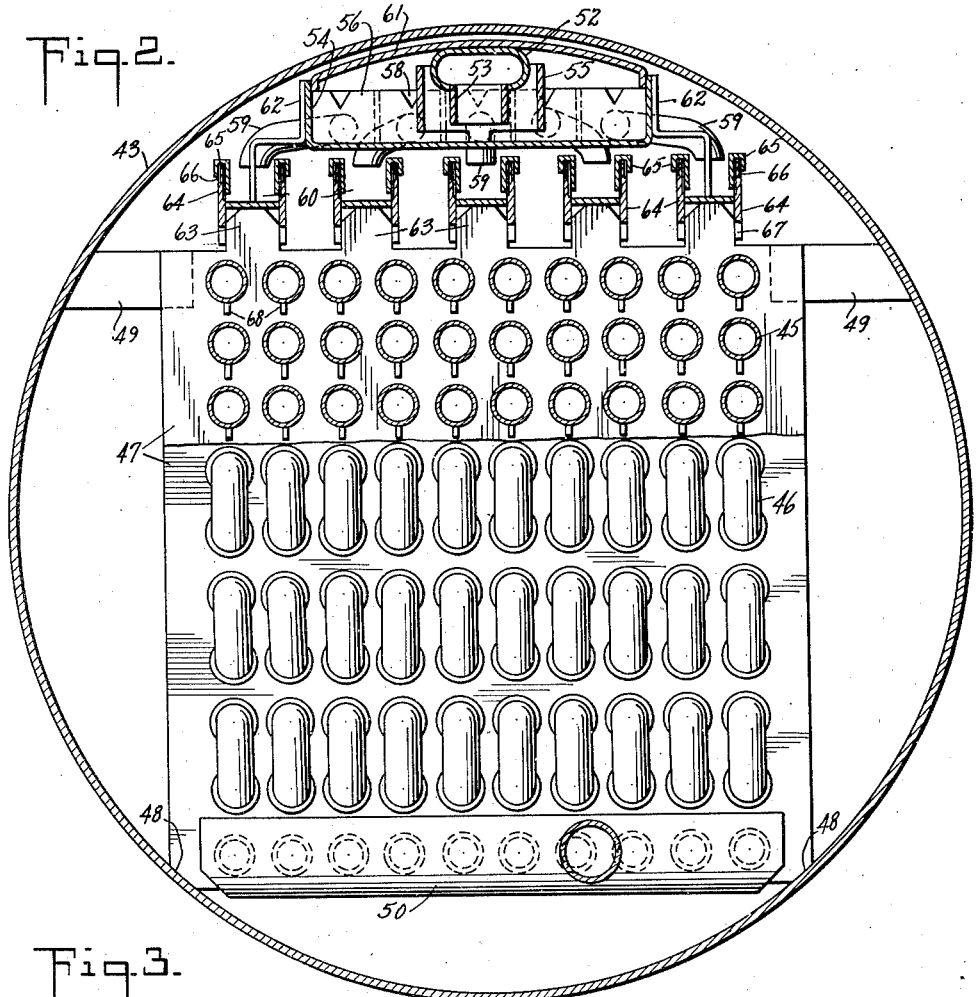
INVENTOR
Per Edberg
BY
his ATTORNEY Patented May 7, 1946

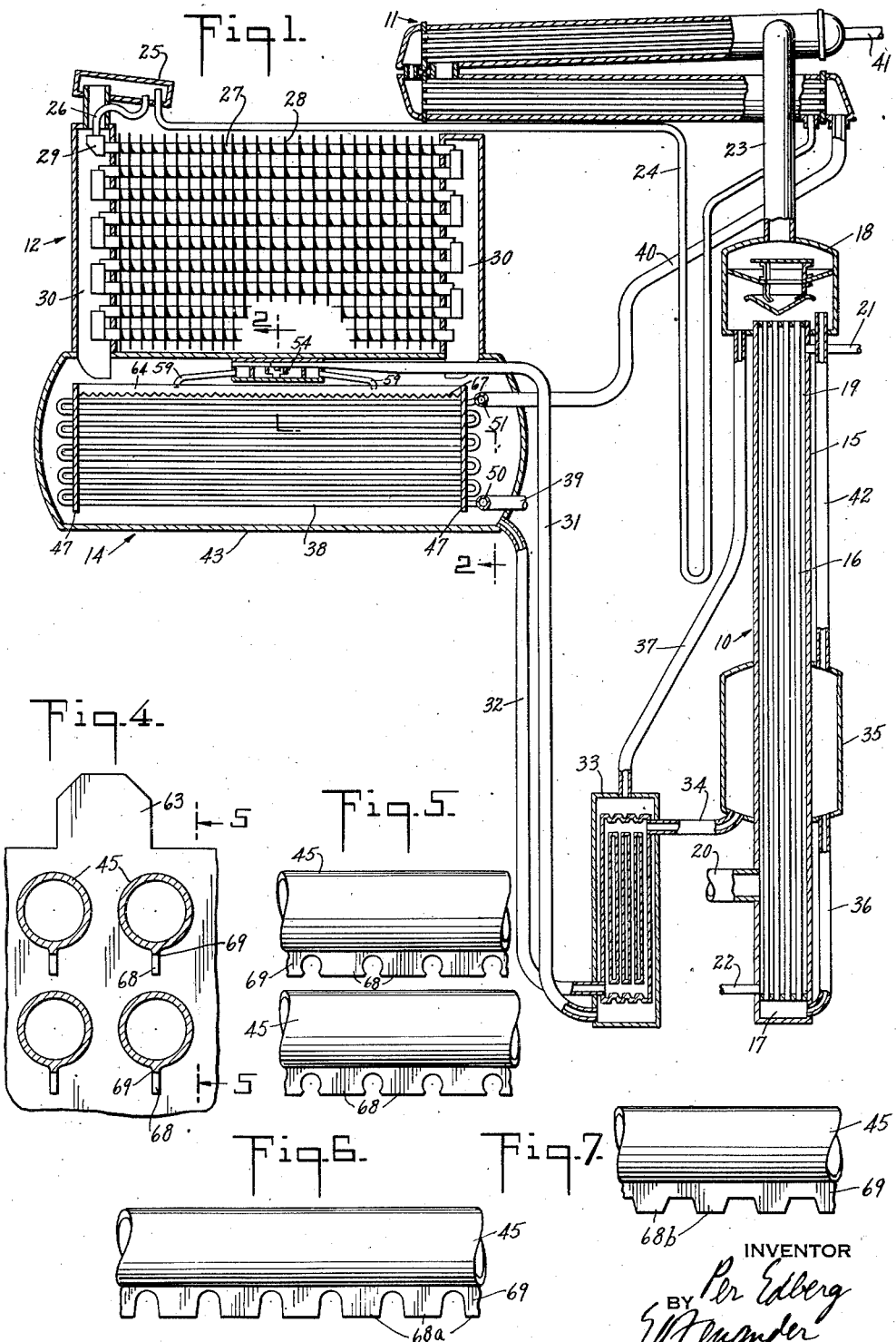

2,399,916

UNITED STATES PATENT OFFICE 2,399,916

REFRIGERATION

Per Edberg, Evansville, Ind., assignor to Servel, Inc., New York, N. Y., a corporation of Delaware Application September 16, 1941, Serial No. 410,964

8 Claims. (Cl. 62—119)

This invention relates to refrigeration, and more particularly to absorbers of absorption type refrigerations systems.

In order to provide ample gas and liquid contact surface in absorbers of the so-called "film" type, a film of absorption liquid is caused to form on the surfaces of piping through which a suitable cooling medium flows. The film of absorption liquid is produced and maintained by utilizing closely spaced horizontal drippers at the bottom parts of piping at which regions drops of liquid form and fall by gravity onto the top parts of piping directly beneath the drip surfaces.

It is an object of the invention to provide an improved absorber in which piping is utilized having a plurality of closely spaced drippers formed integrally therewith. This may be accomplished by providing tubing with a solid fin or flange and suitably notching the fin to form independent drip surfaces.

The above and other objects and advantages of the invention will be more fully understood from the following description and accompanying drawings forming a part of this specification, and of which:

Fig. 1 is a view more or less diagrammatically illustrating an absorption refrigeration system embodying the invention;

Fig. 2 is an enlarged vertical view taken at line 2—2 of Fig. 1, partly broken away and in section, to illustrate the arrangement of the piping in the absorber;

Fig. 3 is a horizontal plan view of the absorber shown in Figs. 1 and 2, the top part of the absorber shell being broken away and in section, to illustrate more clearly the manner in which distribution of absorption liquid is effected;

Fig. 4 is an enlarged fragmentary view of a part of the absorber shown in Fig. 2 to illustrate the invention more clearly;

Fig. 5 is a vertical view taken at line 5—5 of Fig. 4; and

Figs. 6 and 7 are views similar to Fig. 5 illustrating modifications of the invention.

Referring to Fig. 1, my invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator 10, a condenser 11, an evaporator 12 and an absorber 14 which are interconnected in such a manner that the pressure differential in the system is maintained by liquid columns.

The generator 10 includes an outer shell 15 within which are disposed a plurality of vertical riser tubes 16 having the lower ends thereof communicating with a space 17, and the upper ends thereof extending into and above the bottom of a vapor separating vessel 18. The space 19 within shell 15 forms a steam chamber about the tubes 16 to which steam is supplied through a conduit 20. The space 19 provides for full length heating of tubes 16 with a vent 21 to atmosphere being provided at the upper part of shell 15. A conduit 22 is connected to the lower part of shell 15 for draining condensate from space 19.

The system operates at a partial vacuum and contains a solution of refrigerant in absorption liquid, such as, for example, a water solution of lithium chloride or lithium bromide or a suitable mixture of such salts. With steam being supplied through conduit 20 to space 19 at atmospheric pressure, heat is supplied to tubes 16 whereby water vapor is expelled from solution, such expelled vapor being effective to raise liquid absorbent by gas or vapor-lift action. The expelled water vapor passes from the upper ends of the riser tubes into vessel 18, and thence passes through a conduit 23 into condenser 11 in which the vapor is liquefied. The condensate formed in condenser 11 flows through a U-tube 24, a chamber 25, and conduit 26 into the upper part of evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. Liquid refrigerant passes into successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 14.

In absorber 14 refrigerant vapor is absorbed into absorption liquid which enters through a conduit 31, as will be described presently. The absorption liquid into which refrigerant has been absorbed flows from absorber 14 through a conduit 32, a first passage in liquid heat exchanger 33, a conduit 34, vessel 35 and conduit 36 into the lower space 17 of generator 10. Refrigerant vapor is expelled out of solution in generator 10 by heating and absorption liquid is raised by gas or vapor-lift action in riser tubes 16, as explained above.

The raised absorption liquid from which refrigerant vapor has been expelled in generator 10 is conducted from vessel 18 through conduit 37, a second passage in liquid heat exchanger 33, and conduit 31 into the upper part of absorber 14. This circulation of absorption liquid results from raising of liquid by vapor-lift action in riser tubes 16 whereby the liquid can flow to absorber 14 and return from the latter to generator 10 by force of gravity. The upper part of vessel 35 is connected by a conduit 42 to vapor separating vessel 18, so that the pressure in vessel 35 is equalized with the pressure in the upper part of generator 10 and condenser 11.

The heat liberated with absorption water vapor in absorber 14 is transferred to a suitable cooling medium, such as water, for example, which flows through vertically disposed piping 38. The cooling water enters the lower end of the piping 38 through a conduit 39 and leaves the upper end of the piping through a conduit 40. The conduit 40 is connected to condenser 11 whereby the same cooling water may be utilized to cool both condenser 11 and absorber 14, and from the condenser 11 the cooling water leaves through a conduit 41.

In order to simplify the drawings, the parts of the refrigeration system have not been shown in detail, such an illustration of the parts not being necessary for an understanding of my invention. The disclosure in the aforementioned Thomas and Anderson application may be considered as being incorporated in this application, and, if desired, reference may be made thereto for a detailed description of the refrigeration system.

The absorber 14 is generally like that described in application, Serial No. 350,234 of A. R. Thomas and P. P. Anderson, Jr., filed August 3, 1940 now Patent 2,301,232, granted November 10, 1942. Referring more particularly to Figs. 1 and 2, the absorber 14 includes a cylindrical shell 43 to which is secured the lower ends of evaporator headers 30, so that vapor formed in evaporator 12 will pass through the headers into the shell 43. Within shell 43 is disposed the piping 38 formed to provide a plurality of vertical pipe banks arranged alongside of each other. Each pipe bank includes a plurality of substantially horizontal tubes 45 located one above the other and connected by bends 46. The ends of tubes 45 pass through and are secured at openings in end plates 47. The bottom corners of the end plates 47 are welded at 48 to the bottom corners of shell 43, and the top corners thereof are secured by brackets 49 to the upper parts of the shell to provide a rigid support for the piping 38.

The ends of the bottom tubes 45 of each pipe bank are connected to a manifold 50, as shown in Figs. 1 and 2. The top tubes are similarly connected at one end to another horizontal manifold 51, as shown in Fig. 1. The conduits 39 and 40, through which cooling water enters and leaves piping 38, pass through end openings in shell 43 and are connected to the manifolds 50 and 51, respectively.

The conduit 31 through which absorption liquid is introduced into absorber 14 terminates in a flattened or elliptical portion 52 disposed substantially at the center part of shell 43. The elliptical portion 52 is closed at its extreme end and to an opening in the bottom side thereof is secured a short tubular member 53 through which entering absorption liquid passes into a liquid receptacle 54. An annular member 55 is supported in a raised position in vessel 54 to prevent splashing of liquid entering the vessel.

The receptacle 54 is provided with spaced transverse walls 56 to provide smaller end compartments 57 into which liquid flows through V-shaped notches 58 in the walls 56, as shown most clearly in Fig. 2. From the smaller end compartments 57 absorption liquid passes through a plurality of pipes 59 into troughs 60 which are located alongside of each other and extend lengthwise of the shell 44. It will be noted that the pipes 59 lead from directly opposite end compartments 57 at each end of vessel 54, so that absorption liquid is supplied to the same troughs 60 at regions spaced from each other. The vessel 54 is provided with a cover 61 and is supported by suitable brackets 62 to the outermost trough 60, as shown most clearly in Figs. 2 and 3.

The troughs 60 are H-shaped, as best shown in Fig. 2, and are supported at their ends by tabs 63 formed at the top edges of end plates 47. As shown most clearly in Fig. 2 the vertical pipe banks are positioned beneath the side walls 64 of the troughs 60. The troughs 60 are provided with inverted U-shaped cover plates 65 having long inner arms which extend into the troughs and shorter outer arms which overlie the outer surfaces of the side walls 64.

The side walls 64 and cover plates 65 are formed to provide capillary passages for siphoning and distributing liquid onto the uppermost tubes 45. As described in the Thomas and Anderson application Serial No. 350,234 referred to above, this may be accomplished by forming a plurality of closely adjacent vertical slots in the inner and outer surfaces of the side walls 64 and connecting such slots by cross slots at the top edges of the side walls. The slots in the side walls are covered by the plates 65 to form capillary passages, as indicated at 66 in Fig. 2, through which flow of liquid is effected by capillary siphon action. After the liquid in the troughs 60 reaches the lower edges of the long side walls of plates 65, flow of liquid is then effected by capillary siphon action. The liquid siphoned from the troughs 60 flows down the outer surfaces of the side walls 64 toward teeth 67 formed by notching the bottom edges of the walls. The downwardly flowing liquid is caused to flow toward a number of spaced points at the bottom edges of the side walls 64 at which regions drops of liquid are formed. The teeth 67 are as close together as possible with the spacing being such that lateral bridging of the teeth with liquid is prevented. In this manner drops of liquid formed at the teeth 67 fall in rapid succession onto the top surfaces of the uppermost horizontal tubes 45. The Thomas and Anderson application just referred to may be considered as being incorporated in this application, and, if desired, reference may be made thereto for a detailed description of the longitudinal subdivision of liquid from the liquid troughs 60.

Referring to Figs. 4 and 5, the horizontal tubes 45 are provided with a plurality of independent drippers 68. The drippers 68 are located between the notched regions of a fin or flange 69 formed integrally with each horizontal tube 45. In the embodiment illustrated in Figs. 4 and 5 the notches are somewhat of keyhole shape to form the drippers 68.

The liquid flowing by gravity over the surfaces of tubes 45 flows onto the drippers 68 at which regions drops of liquid are formed. The drops of liquid formed at drippers 68 fall by gravity and in rapid succession at a series of spaced points along the entire lengths of the tubes 45 with the drops of liquid flowing onto the top surfaces of successively lower tubes and immediately merging to form liquid films.

To promote the spreading of liquid in the manner just described, the notches are of such size and shape that liquid does not bridge-over the gaps or spaces between the drippers 68. The bottom edge of each dripper 68 is of such length that the drop of liquid formed thereon at least covers a tube surface equal to the dripper spacing. To promote complete wetting of the tube surfaces the drippers 68 are spaced as close together as possible. The extreme bottom edges of the drippers 68 are preferably spaced from the top surface portions of the tubes 45 directly beneath the drippers a vertical distance substantially the diameter of a drop of liquid. With this arrangement the maximum gas and liquid contact surface is obtained for an absorber of a given size.

By forming the drippers 68 in fins 69 which are integral with tubes 45, there is no difficulty in centering drippers and providing proper contact with the tubes, as is the case when separate dripper elements are fastened onto curved piping surfaces. Adjusting of separate dripper elements may be extremely troublesome at times, particularly in a compact and closely packed tube assembly like that shown in Fig. 2. With the drippers 68 formed in surface portions which are integral with and a part of the tubes, not only are the horizontal drip surfaces accurately located and spaced but good heat exchange surfaces are also provided from which heat is given up to the cooling water flowing within the tubes 45.

In Figs. 6 and 7 are illustrated embodiments of the invention in which the drippers are formed between notches of different shape from those shown in Fig. 5. In Fig. 6 the drippers 68a are formed between the regions of U-shaped notches provided in the fin 69 which is integral with and a part of a tube 45. The liquid flowing by gravity over the surface of tube 45 flows on the drippers 68a at which regions drops of liquid are formed. The drops of liquid formed at the drippers 68a fall by gravity onto the top surfaces of a tube directly beneath the drippers with the drops of liquid immediately merging to form a liquid film.

In Fig. 7 the solid fin 69 is notched to form teeth 68b which serve as independent drip surfaces at which drops of liquid are formed and from which such drops of liquid fall onto the top surface of the tube directly beneath the teeth to form a liquid film.

The absorption liquid, flowing over the outer surfaces of the horizontal tubes 45 and fins 69 associated therewith, absorbs the water vapor passing into the shell 43 from evaporator 12. The heat of absorption, resulting from absorption of water vapor by the absorption solution, is given up to the cooling water which flows inside the tubes 45. The absorption solution then passes from the bottom of the shell 43 into conduit 32 and thence flows to the generator 10, as explained above.

By subdividing the liquid along the lengths of tubes 45 in the manner just described, so that liquid films are formed at the top surfaces of all of the tubes including those in the bottom part of the absorber, any tendency for the liquid drops to run together to produce individual streams of liquid at localized areas is avoided. By producing and maintaining liquid films over the entire peripheral surfaces of the tubes the latter are always completely wetted, so that the capacity and ability of the absorber to absorb refrigerant vapor into absorption liquid is not impaired.

By the term "fin or flange" as used in the claims it is meant that the tube has a continuous depending rib which is notched to provide the drop formers.

While several embodiments of the invention have been shown and described, such variations and modifications are contemplated which come within the true scope and spirit of the invention, as pointed out in the following claims.

What is claimed is:

1. Refrigeration apparatus of the absorption type including structure for effecting gas and liquid contact including a plurality of elements disposed one above the other, structure for delivering liquid onto one of said elements to produce and maintain a liquid film on a surface thereof, said one element having an integral fin or flange depending from the bottom thereof and notched at spaced intervals to provide a plurality of independent drop formers between the notches, said drop formers serving as fixed regions at which drops of liquid are formed and being spaced apart such a distance that drops of liquid fall therefrom onto the next lower element sufficiently close together to merge practically immediately upon contacting said next lower element to produce and maintain a liquid film on said next lower element.

2. In an absorption refrigeration system having a generator, a condenser, an evaporator and an absorber, and members connecting the aforementioned parts for circulation of refrigerant and absorption liquid, structure to subdivide liquid including a substantially horizontal liquid holder, a vertically extending wall associated with said holder, said wall being provided with independent horizontal drip surfaces at its lower edge, means to deliver liquid to said holder, means to siphon liquid from said holder onto said vertically extending wall to cause drops of liquid to fall in rapid succession by gravity from said horizontal drip surfaces, a vertically disposed bank of substantially horizontal tubes located below said horizontal drip surfaces, connections for introducing cooling fluid to said tubes, said horizontal tubes having an integral fin or flange depending from the bottom thereof and notched at spaced intervals to provide liquid drop formers at the bottom parts of said tubes between adjacent notches to cause drops of liquid to form and fall by gravity onto the top surfaces of successively lower tubes, said drop formers being formed integrally with said tubes to provide continuous outside surfaces for the flow of liquid thereon and being spaced apart such a distance that spreading of liquid on the tubes to produce and maintain liquid films thereon is promoted.

3. In absorption refrigeration apparatus, a first horizontal tube, a second horizontal tube below said first tube, structure to produce a falling liquid film on said first tube, said first tube having an integral fin or flange depending from the bottom thereof and notched at spaced intervals to provide liquid drop formers between adjacent notches at the bottom part thereof to cause drops of liquid to form and wall by gravity onto the top surface of said second tube, said drop formers being spaced apart such a distance that bridging of the drop formers by the liquid is avoided and at the same time being sufficiently close together so that, when the drops of liquid hit said second tube, the drops of liquid practically immediately merge to form a liquid film on said second tube to effect complete wetting of the latter.

4. Refrigeration apparatus of the absorption type including structure for effecting gas and liquid contact including piping having tubes disposed substantially horizontally, one above the other, conduit means connected to introduce a cooling fluid into said piping, each of said tubes having an integral fin or flange depending from the bottom thereof and notched at spaced intervals to provide a plurality of independent horizontal drop formers between adjacent notches at the bottom part thereof, structure for delivering liquid onto said piping whereby liquid descends by gravity from one tube to another, said drop formers being spaced apart such a distance that drops of liquid fall therefrom onto the next lower tube sufficiently close together to merge immediately upon contacting said next lower tube to produce and maintain liquid films on the tubes, and the bottom edges of said drop formers being spaced from the top of the tube immediately below it substantially the diameter of a drop of liquid.

5. Refrigeration apparatus of the absorption type including structure for effecting gas and liquid contact comprising piping having sections thereof disposed substantially horizontally, one above the other, said sections having depending fins or flanges formed integrally therewith at the bottom parts thereof, and said fins or flanges being notched to provide regions between adjacent notches serving as independent horizontal drip surfaces, structure for delivering liquid upon said piping whereby liquid descends by gravity from one section to another, and said notches or drop formers being spaced apart such a distance that drops of liquid fall therefrom onto the next lower pipe section and merge practically immediately upon contacting said next lower pipe section to produce and maintain a liquid film for completely wetting the exterior surfaces of the pipe sections.

6. Refrigeration apparatus of the absorption type including structure for effecting gas and liquid contact comprising piping having horizontal tubes disposed one above the other, means to produce and maintain a liquid film on the uppermost of said tubes, fins or flanges formed integrally with said tubes at the bottom parts thereof, and said fin or flange being formed with notches of key-hole shape serving as drop formers at which regions drops of liquid are formed and from which drops of liquid fall onto the top surfaces of the successively lower tubes, said drop formers serving as fixed points from which drops of liquid fall and arranged so that spreading of liquid on the tubes to produce and maintain liquid films thereon is promoted, said drop formers being spaced apart such a distance from each other and the top surfaces of the underlying tubes that any tendency of the drops of liquid to produce distinct individual streams at localized areas is avoided.

7. Refrigeration apparatus of the absorption type including structure for effecting gas and liquid contact comprising piping having horizontal tubes disposed one above the other, means to produce and maintain a liquid film on the uppermost of said tubes, fins or flanges formed integrally with said tubes at the bottom parts thereof, and said fins or flanges having U-shaped notches with the open ends thereof at the extreme bottom edge of the fins or flanges serving as drop formers at which regions drops of liquid are formed and from which drops of liquid fall onto the top surfaces of the successively lower tubes, said drop formers serving as fixed points from which drops of liquid fall and arranged so that spreading of liquid on the tubes to produce and maintain liquid films thereon is promoted, said drop formers being spaced apart such a distance from each other and the top surfaces of the underlying tubes that any tendency of the drops of liquid to produce distinct individual streams at localized areas is avoided 8. Refrigeration apparatus of the absorption type including structure for effecting gas and liquid contact comprising piping having horizontal tubes disposed one above the other, means to produce and maintain a liquid film on the uppermost of said tubes, fins or flanges formed integrally with said tubes at the bottom parts thereof, and said fins or flanges having V-shaped notches to provide spaced apart teeth serving as drop formers at which regions drops of liquid are formed and from which drops of liquid fall onto the top surfaces of the successively lower tubes, said drop formers serving as fixed points from which drops of liquid fall and arranged so that spreading of liquid on the tubes to produce and maintain liquid films thereon is promoted, said drop formers being spaced apart such a distance from each other and the top surfaces of the underlying tubes that any tendency of the drops of liquid to produce distinct individual streams at localized areas is avoided.

PER EDBERG.